United States Patent [19]

Wallace

[11] Patent Number: 4,680,334

[45] Date of Patent: Jul. 14, 1987

[54] FLAME RETARDANT POLYMER COMPOSITIONS CONTAINING MOLYBDENUM COMPOUNDS AND SULFUR-CONTAINING POLYMERS

[75] Inventor: Lawrence R. Wallace, Evansville, Ind.

[73] Assignee: E. I. Du Pont de Nemours and Company, Wilmington, Del.

[21] Appl. No.: 780,365

[22] Filed: Sep. 26, 1985

[51] Int. Cl.$^4$ .................. C08K 3/32; C08K 3/30; C08K 3/28; C08K 3/26; C08K 3/24; C08K 3/22

[52] U.S. Cl. .................. 521/406; 524/399; 524/567; 524/576; 525/239

[58] Field of Search .............. 524/175, 399, 406, 609, 524/567, 576, 412; 525/371, 372, 212, 239

[56] References Cited

U.S. PATENT DOCUMENTS

| | | | |
|---|---|---|---|
| 2,956,980 | 10/1960 | Law .................................... | 525/239 |
| 3,209,055 | 9/1965 | Hedberg et al. ..................... | 525/239 |
| 3,882,030 | 5/1975 | Campbell et al. ................... | 524/406 |
| 3,900,441 | 8/1975 | King ................................... | 524/406 |
| 3,914,201 | 10/1975 | Kroenke ............................. | 524/406 |
| 3,965,068 | 6/1976 | Dickens .............................. | 524/406 |
| 3,975,356 | 8/1976 | Dickens .............................. | 524/406 |
| 3,983,086 | 9/1976 | Dickens .............................. | 524/406 |
| 4,002,597 | 1/1977 | Dickens .............................. | 524/406 |
| 4,053,455 | 10/1977 | Kroenke ............................. | 524/406 |
| 4,129,540 | 12/1978 | Kroenke ............................. | 524/406 |
| 4,521,549 | 6/1985 | Penneck ............................. | 524/406 |

OTHER PUBLICATIONS

A. H. Frazier, *High Temperature Resistant Polymers*—Polymer Reviews, vol. 10, pp. 129–138 (1968).

*Primary Examiner*—Veronica P. Hoke
*Attorney, Agent, or Firm*—Cortlan R. Schupbach

[57] ABSTRACT

A synergistic effect in reducing the burning characteristics of polymers is obtained by the use of molybdenum based compounds in conjunction with an effective amount of a sulfur-containing polymer whether used alone or as an additive to other polymeric systems.

9 Claims, No Drawings

FLAME RETARDANT POLYMER COMPOSITIONS CONTAINING MOLYBDENUM COMPOUNDS AND SULFUR-CONTAINING POLYMERS

This invention relates to a method for preparing flame retardant polymer compositions and to the compositions themselves. More specifically, the present invention relates to flame retardant polymer compositions comprising molybdenum compounds in conjunction with an organic sulfur-containing polymer compound in order to reduce burning characteristics of said polymer compounds.

BACKGROUND OF THE INVENTION

Various polymer products have gained many structural applications such as in the construction and transportation industries. In addition, uses are made of many polymer products in fabrics, upholsteries, wallcoverings and the like where flame resistance and smoke formation can be a problem in the event of fire. New governmental and safety regulations relating to such materials are now in effect, requiring not only increased flame resistance but reduced smoke generation from such plastic materials in certain applications, further requiring that such properties be present not only in open burning but also in smoldering states.

A vast amount of research has been carried out to increase flame resistance and reduce smoke in such plastic materials, but further improvement continues to be required in order to make such materials suitable for many applications.

One class of materials long proposed to reduce smoke has been the use of molybdenum compounds, usually in conjunction with other compounds such as antimony oxide, in order to reduce the tendency to burn as well as the amount of smoke generated when combustion of such plastic materials is encountered.

While the vast amount of art available prohibits any detailed discussion of each article or reference, representative but non-exhaustive examples of the prior art dealing with the use of molybdenum compounds in various polymer formulations are set forth below.

U.S. Pat. No. 3,845,001 teaches that copper compounds alone or admixed with molybdenum compounds impart smoke retardant properties to combustible materials such as plastics, including polyvinyl chloride. U.S. Pat. No. 3,900,441 teaches that the smoking tendencies of PVC under combustion conditions is reduced by the use of a combination of zinc and molybdenum compounds. U.S. Pat. No. 3,914,201 indicates that polyvinyl chloride compositions are rendered more flame and smoke retardant by the use of compounds such as $MoS_2$ and $Si_3N_4$ and mixtures of these. U.S. Pat. No. 3,983,086 teaches that smoke retardancy can be imparted to polyvinyl chloride compositions by utilizing nickel compounds in combination with iron compounds including iron molybdate. U.S. Pat. No. 4,053,453 teaches that copper oxylate and amine molybdates in combination provide smoke suppression to polyvinyl chloride compositions which are burned. U.S. Pat. No. 4,055,537 teaches that smoke retardant polyvinyl chloride compositions are obtained by a synergistic mixture of melamine molybdate and certain zinc, borate, manganese and tungsten oxide compounds. U.S. Pat. No. 4,098,753 teaches that ester-type plasticizers and inorganic molybdenum compounds provide smoke suppression to plasticized polyvinyl chloride. U.S. Pat. No. 4,133,823 teaches that the reaction products of metal oxides, such as molybdenum oxides and phosphorus compounds in a trivalent state provide flame and smoke suppression. U.S. Pat. No. 4,328,152 teaches that a combination of zinc phosphates and zinc molybdate compounds provide smoke suppression in polyvinyl chloride.

In addition, several papers published by the Climax Molybdenum Company, Ann Arbor, Michigan, show that molybdenum compounds can be effective smoke suppressants for both plasticized and rigid PVC compounds. In Plastic Engineering, 1975, 31(12), 36–8, molybdenum trioxide and ammonium molybdates were taught to be flame retardants and smoke suppressants for PVC. In the Society for Plastic Engineering Technical Papers, 1977, No. 23, pp. 414–416, molybdenum compounds were taught to be effective smoke suppressants for rigid and plasticized PVC. In Fire Retardant Proceedings; The International Symposium, Flammability Fire Retardants, 1976, pp. 216–227, molybdenum compounds were taught to be effective fireproofing agents and smoke suppressants for flexible PVC, especially in combination with antimony oxide.

SUMMARY OF THE INVENTION

In one aspect, the present invention provides a method for greatly increasing the effectiveness of molybdenum compounds, both as flame retardants and smoke suppressants in various polymer formulations. In another aspect the present invention provides for the effective use of molybdenum compounds in synergistic combination with sulfur-containing polymer compounds in order to greatly increase the flame resistance of such materials while taking advantage of the well-known smoke suppressant qualities of molybdenum compounds.

Thus, the instant invention deals with flame retardant polymer compositions comprising at least one polymer component containing organic sulfur, when said polymer component is present at a concentration such that the sulfur content of the total polymer composition is at least 0.1 parts per hundred resin, in combination with molybdenum in sufficient concentration to provide flame suppression.

Normally, the flame retardant polymer compositions will contain at least 0.1 parts per hundred resin but at least 0.3 parts per hundred resin are preferred. Higher sulfur concentrations of the order of 3 to 5 percent by weight are likewise useful. It must be realized that the sulfur present, in order to be effective in the present invention, must be an organic sulfur bound to a polymer component. Sulfur obtained from other sources, such as metal sulfides and elemental sulfur does not provide the synergistic effects noted with the polymer bound organic sulfur, although metal sulfides can be used as a source of metal.

The molybdenum of the present invention can be obtained from any source which is not detrimental to the ultimately desired physical properties of the polymer composition. Representative but non-exhaustive molybdenum sources are molybdenum oxides and other molybdenum-containing salts selected from the group consisting of halides, phosphates, carbonates, oxyhalides, halide hydrates, acetates, nitrates, sulfides, chromates, and molybdates.

In order to be effective, molybdenum, calculated as metal, will normally be present in the polymer composition at a concentration of at least 0.5 parts per hundred resin. However, it is preferred that the molybdenum be present at levels such as 2.0 parts per hundred resin to about 5 parts per hundred resin. In the instant invention, increasing the amount of molybdenum present is not detrimental to the flame retardant characteristics of the present invention. However, after molybdenum levels increase beyond about 15 parts per hundred resin, a plateau is seen wherein little additional flame retardancy is observed.

Thus, the instant invention likewise comprises a method of imparting flame resistance to polymer compositions by adjusting the organic sulfur content in said polymer compositions to provide at least 0.1 parts per hundred resin sulfur based on the total polymer present and adding sufficient molybdenum (at least about 0.5 parts per hundred resin when calculated as metal) to provide flame retardancy.

Representative but non-exhaustive examples of suitable organic sulfur containing materials useful in the practice of the present invention are polysulfide resins and polyphenylenesulfides as well as chlorosulfonated polyethylenes. Chlorosulfonated polyethylene resins are preferred in the practice of the present invention and are readily available from manufacturers such as E. I. du Pont de Nemours & Co. which markets chlorosulfonated polyethylene resins in large quantities. The trademark Hypalon® synthetic rubber is utilized by Du Pont in its marketing of such chlorosulfonated polyethylenes resins. Preferably the chlorosulfonated polyethylenes used in the present invention will have a chlorine content of at least about 15 percent by weight and a sulfur content of at least about 0.5 percent by weight. However, more normally such chlorosulfonated polyethylenes will have a chlorine content of at least about 25 percent by weight and a sulfur content of at least 1 percent by weight. It will be appreciated by those skilled in this art that the molecular weight of the chlorosulfonated polyethylenes be sufficiently high to be a rubbery solid which can be compounded with the other polymeric ingredients.

The source of the molybdenum is not critical other than the molybdenum be present in a form not detrimental to the ultimate polymer composition. Representative but nonexhaustive examples of such molybdenum compounds are $MoS_2$, $MoO_3$, $CaMoO_4$, $Mo_2O_5$, $MoS_3$, $Mo_2O_3$, $Mo_2S_3$, $MoO_2$, $MoS_4$, $MoCl_3$, $MoBr_3$, $PbMoO_4$, ammonium 5-molybdocobaltate (III), 9-molybdonickelate (IV), 6-molybdoaluminate (III), 6-molybdochromate (III), ammonium dimolybdate, ammonium molybdate, ammonium heptamolybdate, ammonium octamolybdate, ammonium phosphomolybdate, alkali metal molybdates, and alkaline earth molybdates.

The instant invention is more concretely described with reference to the examples below wherein all parts and percentages are by weight unless otherwise specified. The Examples are provided to illustrate the present invention and not to limit it.

In the tests which were carried out, certain materials were used to prepare the test formulations. In the Examples which follow, polyvinyl chloride (PVC) was obtained from Conoco Chemical Company as PVC 5425. Lead stabilizers used were dibasic lead phthlates. The clay was Burgess SP-33, sold by Burgess Chemical Co. Paraffin lubricants used were XL-165, trademark of and sold by Hoechst Company. Chlorinated polyethylene (CPE) was Hypalon® HPR 5857, trademark of and sold by E. I. du Pont de Nemours & Co. Chlorosulfonated polyethylenes (CSM) were various grades of Hypalon® rubbers, trademark of and sold by Du Pont Chemical Company. Oxidized polyethylene was obtained as AC6A, trademark of and sold by Allied Chemical Company. The lubricant used was Loxiol 7121, trademark of and sold by Henkel Chemical Company.

EXAMPLES 1 and 2

A comparative example was carried out using a flexible polyvinyl chloride formulation based on 100 parts by weight of polyvinyl chloride. The formulations were mixed by milling at 330° F. and pressed into test plaques for percent smoke and limiting oxygen index (LOI) tests. All LOI tests were carried out using a 6-inch by 6-inch by 0.072-inch plaque following the procedure of ASTM D2863. All tests for smoke were carried out in an Arapahoe smoke chamber using a 3-inch by 3-inch by ⅛-inch plaque. Lead stabilizers utilized were dibasic lead phthalate. Comparative formulations were prepared using the test formulation set forth below.

TABLE 1

|  | 1 | 2 |
|---|---|---|
| PVC | 100* | 100* |
| Trioctyl trimellitate (TOTM) | 48 | 48 |
| Lead Stabilizer | 6 | 6 |
| Clay | 26 | 23.5 |
| Paraffin Lubricant | 0.2 | 0.2 |
| $MoO_3$ | — | 2.5 |
|  | 180.2 | 180.2 |
| LOI | 26.5 | 27.5 |
| % Smoke | 8.5 | 5.8 |

*Parts by weight

The test results clearly show that the presence of molybdenum trioxide in the formulation utilizing polyvinyl chloride alone reduces smoke as would be expected from the teachings of the prior art, but that flame retardancy as indicated by LOI was essentially unchanged.

EXAMPLES 3 and 4

A second test was carried out utilizing as the polymer chlorosulfonated polyethylene (Hypalon 40, trademark of and sold by Du Pont Company). The formulas were identical except for the addition of 5 parts of molybdenum trioxide in the comparative formulation. The samples were prepared by milling at 300° F. and pressing into test plaques. The results are set for in Table 2 below.

TABLE 2

|  | 3 | 4 |
|---|---|---|
| CSM | 200 | 200 |
| Lead Stabilizer | 7 | 7 |
| Calcium Stearate | 2 | 2 |
| $MoO_3$ | — | 5 |
|  | 209 | 214 |
| LOI | 24.5 | 33.5 |
| % Smoke | 9.8 | 6.6 |

When comparing Example 1 with Example 2 it can be clearly seen that molybdenum trioxide acts as only a smoke suppressant in PVC formulations; $MoO_3$ is not a flame retardant in such PVC formulations. However, when comparing Examples 3 and 4 it is clear that $MoO_3$ is unexpectedly both a flame retardant and smoke suppressant for an organic sulfur containing polymer formulation.

EXAMPLES 5 through 8

In view of the large amount of literature concerning the effect of molybdenum and antimony compounds, a formulation was devised utilizing both molybdenum and antimony in combination with a sulfur-containing polymer formulation. The formulation utilized is set forth in Table 3. All formulations were mixed on a mill at about 300° F. and pressed into test plaques. Limiting oxygen index and percent smoke were carried out. Results are shown in Table 3.

TABLE 3

|  | 5 | 6 | 7 | 8 |
|---|---|---|---|---|
| PVC | 100 | 100 | 100 | 100 |
| CPE | 75 | 75 | 75 | 75 |
| CSM | 25 | 25 | 25 | 25 |
| Lead Stabilizer | 7 | 7 | 7 | 7 |
| Oxidized PE | 3 | 3 | 3 | 3 |
| Lubricant | 1 | 1 | 1 | 1 |
| $Sb_2O_3$ | — | 5 | 5 | — |
| $MoO_3$ | — | — | 5 | 5 |
|  | 211.0 | 216.0 | 221.0 | 216.0 |
| LOI | 34.5 | 40.0 | 46.0 | 46.5 |
| % Smoke | 12.4 | 11.6 | 7.1 | 5.3 |

Comparing the results from Example 5 and Example 6 clearly shows that antimony trioxide is an effective flame retardant, raising the limiting oxygen index from about 34 to about 40 as could be expected from the prior literature. However, antimony oxide does not effectively lower smoke, since smoke decreased only from about 12.4 to about 11.6, very nearly experimental error. Example 7 shows that molybdenum trioxide assists the antimony trioxide by lowering smoke effectively from 11.6 to about 7.1. Example 8 clearly shows that molybdenum trioxide alone is unexpectedly more effective as both a smoke and flame retardant than either antimony trioxide alone or a mixture of antimony trioxide and molybdenum trioxide when used in an organic sulfur-containing polymer formulation.

COMPARATIVE EXAMPLES 9 through 14

Experiments were carried out to test the effects of antimony trioxide and alumina trihydrate. Examples 9 through 14 were carried out utilizing the same formulation except that the amounts of alumina trihydrate and antimony trioxide were varied. The effects of combining antimony trioxide and alumina trihydrate tended to be additive in distinct contrast to the unexpected results obtained with molybdenum trioxide. In the formulations tested, the formulations were milled at 320° F. and pressed into plaques for testing. The results are set forth in Table 4 below.

TABLE 4

|  | 9 | 10 | 11 | 12 | 13 | 14 |
|---|---|---|---|---|---|---|
| PVC | 100 | 100 | 100 | 100 | 100 | 100 |
| CPE | 75 | 75 | 75 | 75 | 75 | 75 |
| CSM | 25 | 25 | 25 | 25 | 25 | 25 |
| Lead Stabilizer | 7 | 7 | 7 | 7 | 7 | 7 |
| Oxidized PE | 3 | 3 | 3 | 3 | 3 | 3 |
| Lubricant | 1 | 1 | 1 | 1 | 1 | 1 |
| Alumina Trihydrate | — | 15 | — | 15 | 15 | — |
| $Sb_2O_3$ | — | — | 5 | 5 | — | — |
| $MoO_3$ | — | — | — | — | 5 | 5 |
|  | 211.0 | 226.0 | 216.0 | 231.0 | 231.0 | 216.0 |
| LOI | 34.5 | 38.0 | 40.0 | 43.0 | 47.0 | 46.5 |
| % Smoke | 12.4 | 8.2 | 11.6 | 9.8 | 4.2 | 5.3 |

From the Table 4 results, it is apparent that when the comparative case (Example 9) is modified by alumina trihydrate alone (Example 10), LOI does not apparently change, but smoke is greatly reduced. Using only antimony trioxide (Example 11), LOI is significantly increased, but little effect on smoke is seen. Use of *both* alumina trihydrate and antimony trioxide (Example 12) shows these materials produce additive effects on both LOI and smoke.

Addition of $MoO_3$ to alumina trihydrate (Example 13) vastly increases the LOI while lowering smoke drastically as compared to alumina trihydrate alone (Example 10). Elimination of the alumina trihydrate from the recipe altogether (Example 14) shows no significant loss in either LOI or smoke reduction as compared to Example 13.

EXAMPLES 15 through 17

Tests were carried out to determine the effect on flame retardancy of the form of sulfur when added to the formulations together with molybdenum compounds. Formulations were prepared according to Examples 15, 16 and 17, milled at 320° F. and pressed into plaques. Sulfur content imparted to Example 16 utilizing elemental sulfur was equivalent to sulfur content imparted by chlorosulfonated materials of Example 15. Results are set forth in Table 5.

TABLE 5

|  | 15 | 16 | 17 |
|---|---|---|---|
| PVC | 100 | 100 | 100 |
| CPE | 100 | 100 | — |
| CSM | — | — | 100 |
| Lead Stabilizer | 7 | 7 | 7 |
| Calcium Stearate | 2 | 2 | 2 |
| $MoO_3$ | 5 | 5 | 5 |
| Sulfur | — | 0.3 | — |
|  | 214.0 | 214.3 | 214.0 |
| LOI | 39.0 | 40.5 | 46.0 |
| % Smoke | 8.7 | 10.9 | 7.1 |

Table 5 results clearly show elemental sulfur was actually detrimental in that smoke generation increased, while LOI results were essentially unaffected.

EXAMPLES 18 through 20

Several experiments were carried out to determine the effect of various chlorine levels in chlorosulfonated materials utilized to provide synergism to molybdenum compounds.

All chlorosulfonated materials utilized were products of the E. I. du Pont de Nemours & Co. The plaques utilized were milled at about 300° F. and pressed into plaques for testing. The results are set forth in Table 6.

TABLE 6

|  | % Cl | % S | 18 | 19 | 20 |
|---|---|---|---|---|---|
| PVC |  |  | 100 | 100 | 100 |
| CSM (Hypalon 45) | 23.8 | 1.0 | 100 | — | — |
| CSM (Hypalon 40) | 34.5 | 1.0 | — | 100 | — |
| CSM (Hypalon 48) | 43.0 | 1.0 | — | — | 100 |
| Lead Stabilizer |  |  | 7 | 7 | 7 |
| Calcium Stearate |  |  | 2 | 2 | 2 |
| $MoO_3$ |  |  | 5 | 5 | 5 |

TABLE 6-continued

| % Cl | % S | 18 | 19 | 20 |
|---|---|---|---|---|
| | | 214.0 | 214.0 | 214.0 |
| LOI | | 35.5 | 46.0 | 50.5 |
| % Smoke | | 12.9 | 7.1 | 8.3 |

Clearly, increasing the chlorine content of the polymers raises the LOI of the formulations.

When reviewing the data presented, it should be realized that limiting oxygen index (LOI) numbers essentially show the propensity of the materials to burn with an open flame and maintain combustion without external heat once ignited. In general, improving the limiting oxygen index from a value of about 20 to 23 to a value of 29 to 32 will indicate a material which will self-extinquish an open flame in the absence of an outside heat source. However, these materials can continue to smolder and produce excessive quantities of smoke. It is therefore vitally important that the amount of smoke be reduced as well eliminating the propensity of such plastics to continue combustion once ignited. The present invention, providing as it does a means for synergisticly decreasing the smoke and increasing the limiting oxygen index of plastics through the use of organic sulfur-containing polymers and molybdenum compounds, clearly provides benefits not obtainable with the materials of the prior art.

While certain embodiments and details have been shown for the purpose of illustrating the present invention, it will be apparent to those skilled in this art that various changes and modifications may be made herein without departing from the spirit or scope of the invention.

I claim:

1. Flame retardant compositions comprising chlorosulfonated polyethylene together with at least one resin selected from the group consisting of chlorinated polyethylene and polyvinyl chloride, wherein the chlorosulfonated polyethylene is present at a concentration such that the sulfur content of the total polymer composition is at least 0.1 parts per hundred resin, in combination with molybdenum in sufficient concentration to provide flame suppression, wherein the molybdenum is provided by molybdenum oxides and molybdenum containing salts selected from the group consisting of halides, phosphates, carbonates, oxyhalides, halide hydrates, acetates, nitrates, sulfides, chromates and molybdates.

2. A composition as described in claim 1 wherein molylbdenum as metal is present at a concentration of at least 0.5 parts per hundred resin.

3. A composition as described in claim 2 wherein the molybdenum is obtained from at least one compound selected from the group consisting of $MoS_2$, $MoO_3$, $CaMoO_4$, $Mo_2O_5$, $MoS_3$, $Mo_2S_3$, $Mo_2O_3$, $MoO_2$, $MoS_4$, $MoCl_3$, $MoBr_3$, $PbMoO_4$, ammonium 5-molybdocobaltate (III), 9-molybdonickelate (IV), 6-molybdoaluminate (III), 6-molybdochromate (III), ammonium dimolybdate, ammonium molybdate, ammonium heptamolybdate, ammonium octamolybdate, ammonium phosphomolybdates, alkali metal molybdates, and alkaline earth molybdates.

4. A composition as described in claim 1 wherein both chlorinated polyethylene and polyvinyl chloride are present.

5. A composition is described in claim 4, wherein the composition is substantially antimony-free.

6. A method of imparting flame resistance to polymer compositions containing at least one resin selected from the group consisting of chlorinated polyethylene and polyvinyl chloride, comprising adjusting the organic sulfur content in said polymer compositions by adding sufficient chlorosulfonated polyethylene to provide an organic sulfur content of at least 0.1 parts per hundred resin, based on the total polymer present in such compositions, and adding sufficient molybdenum to provide flame retardance, wherein molybdenum is obtained from a molybdenum-containing compound selected from the group consisting of halides, phosphates, carbonates, oxyhalides, halide hydrates, acetates, oxides, nitrates, sulfides, chromates and molybdates.

7. A method as described in claim 6 wherein the molybdenum is obtained from at least one compound selected from the group consisting of $MoS_2$, $MoO_3$, $CaMoO_4$, $Mo_2O_5$, $Mo_2O_3$, $MoS_3$, $Mo_2S_3$, $MoO_2$, $MoS_4$, $MoCl_4$, $MoBr_3$, $PbMoO_4$, ammonium 5-molybdocobaltate (III), 9-molybdonickelate (IV), 6-molybdoaluminate (III), 6-molybdochromate (III), ammonium dimolybdate, ammonium molybdate, ammonium heptamolybdate, ammonium octamolybdate, ammonium phosphomolybdate, alkali metal molybdates, and alkaline earth molybdates.

8. A method as described in claim 7 wherein the molybdenum is selected from the group consisting of molybdenum oxides and molybdenum sulfides.

9. A method as described in claim 8 wherein the molybdenum as metal is present at concentration of at least 0.5 parts per hundred resin.